(12) United States Patent
Harkins

(10) Patent No.: US 10,006,197 B1
(45) Date of Patent: Jun. 26, 2018

(54) INSULATION SYSTEM FOR PORTABLE BUILDINGS

(71) Applicant: Daniel J. Harkins, Port Charlotte, FL (US)

(72) Inventor: Daniel J. Harkins, Port Charlotte, FL (US)

( * ) Notice: Subject to any disclaimer, the term of this patent is extended or adjusted under 35 U.S.C. 154(b) by 0 days. days.

(21) Appl. No.: 15/864,064

(22) Filed: Jan. 8, 2018

Related U.S. Application Data

(63) Continuation-in-part of application No. 15/249,528, filed on Aug. 29, 2016, now Pat. No. 9,885,182.

(51) Int. Cl.
| | |
|---|---|
| *E04B 1/76* | (2006.01) |
| *E04B 1/24* | (2006.01) |
| *E04B 1/343* | (2006.01) |

(52) U.S. Cl.
CPC .......... *E04B 1/7608* (2013.01); *E04B 1/7654* (2013.01); *E04B 1/24* (2013.01); *E04B 1/34315* (2013.01)

(58) Field of Classification Search
CPC ......... E04D 5/142; E04D 5/146; E04D 5/148; E04B 1/7608; E04B 1/7654; E04B 1/34315
USPC .............. 52/22, 63, 749.12; 160/265, 368.2; 135/115, 119, 120.3
See application file for complete search history.

(56) References Cited

U.S. PATENT DOCUMENTS

| | | | |
|---|---|---|---|
| 1,106,624 A | | 8/1914 | Cadwallader et al. |
| 2,883,712 A | * | 4/1959 | Shelamer, Sr. ..... E04B 1/34315 52/148 |
| 2,989,154 A | * | 6/1961 | Colby, Jr. ................. E04B 1/24 52/643 |
| 3,343,321 A | * | 9/1967 | Axelsson ............ E04B 1/34315 52/296 |
| 4,259,819 A | | 4/1981 | Wemyss |
| 4,387,533 A | * | 6/1983 | Green ...................... A01G 9/22 47/17 |
| 4,548,002 A | * | 10/1985 | Murray ................. E04D 13/155 52/22 |
| 4,961,297 A | * | 10/1990 | Bernard ............. E04B 1/34315 52/655.1 |
| 5,197,238 A | * | 3/1993 | Peleg .................... A01G 9/1407 52/13 |
| 5,201,152 A | * | 4/1993 | Heffner .................. B08B 15/02 52/64 |

(Continued)

*Primary Examiner* — Paola Agudelo
(74) *Attorney, Agent, or Firm* — Donald J. Ersler

(57) ABSTRACT

An insulation system for portable buildings preferably includes a plurality of support struts, a plurality of cross tube clamps and a ceiling sheet. The support strut is preferably a tube having a length, which is substantially equal to a distance between two adjacent rafters. Three support struts are attached to bottom support tubes of two adjacent rafters with two cross tube clamps. The three support struts may also be attached to vertical support tubes of two adjacent rafters with two in-line cross tube clamps. Opposing edges of the ceiling sheet are attached to the bottom support tubes or the vertical support tubes of the two adjacent rafters with at least two sheet clamps. An insulation retention member is placed adjacent a top of the ceiling sheet to prevent insulation from sliding down the ceiling sheet. Two adjacent insulation retention members may be secured to each other with a joining device.

18 Claims, 21 Drawing Sheets

(56) References Cited

U.S. PATENT DOCUMENTS

| | | | | |
|---|---|---|---|---|
| 5,245,802 | A | * | 9/1993 | Davis ................ E04B 1/34315 135/97 |
| 5,311,699 | A | * | 5/1994 | Huffman ................ A01G 9/22 47/22.1 |
| 6,006,485 | A | * | 12/1999 | Hobbs ................ E04B 1/24 52/489.1 |
| 6,026,613 | A | * | 2/2000 | Quiring ................ E04B 7/08 52/63 |
| 6,094,883 | A | * | 8/2000 | Atkins ................ E04D 12/002 156/71 |
| 6,421,980 | B1 | * | 7/2002 | Alderman ............ E04D 13/1618 52/404.3 |
| 9,303,405 | B2 | * | 4/2016 | Nelson ................ E04C 3/09 |
| 9,528,273 | B1 | | 12/2016 | Harkins |
| 2008/0115455 | A1 | * | 5/2008 | Nadon ................ E04B 1/3205 52/798.1 |
| 2015/0368897 | A1 | * | 12/2015 | Beattie ................ E04B 1/76 52/406.1 |

* cited by examiner

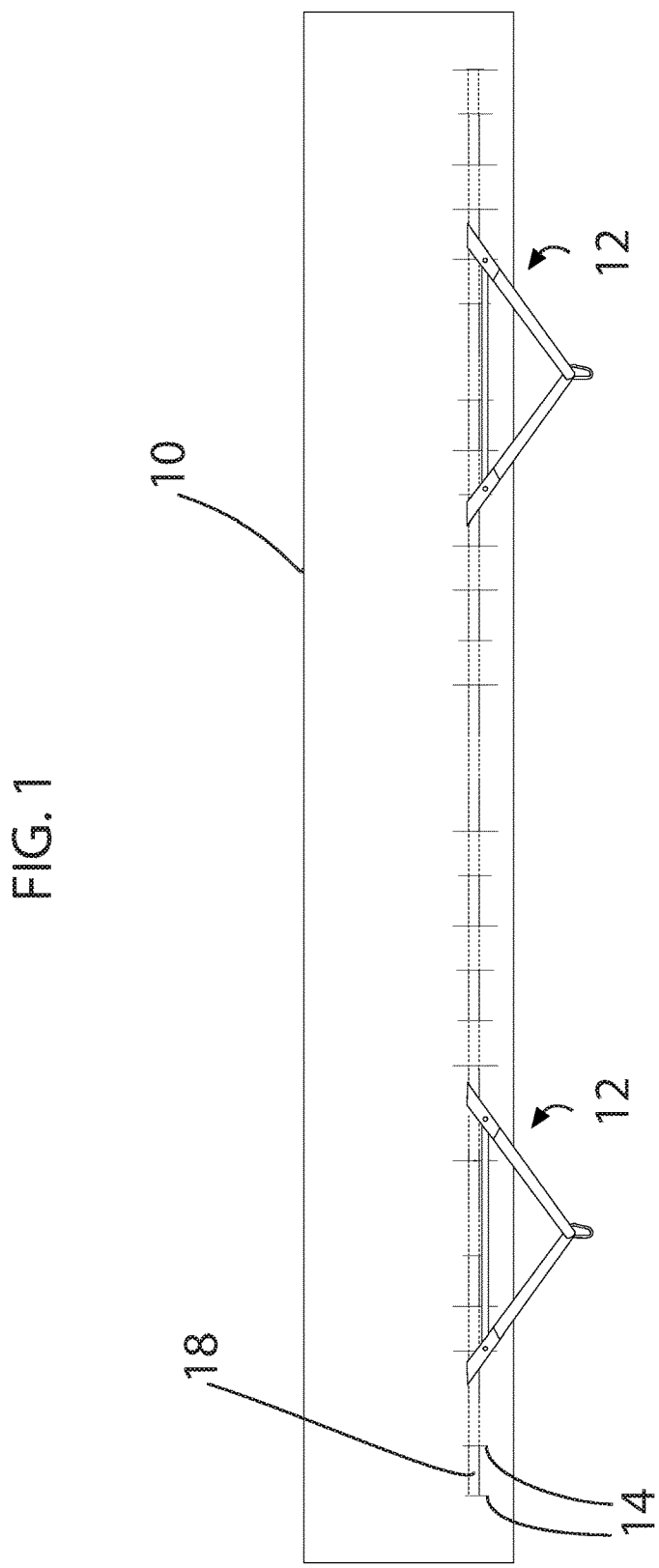

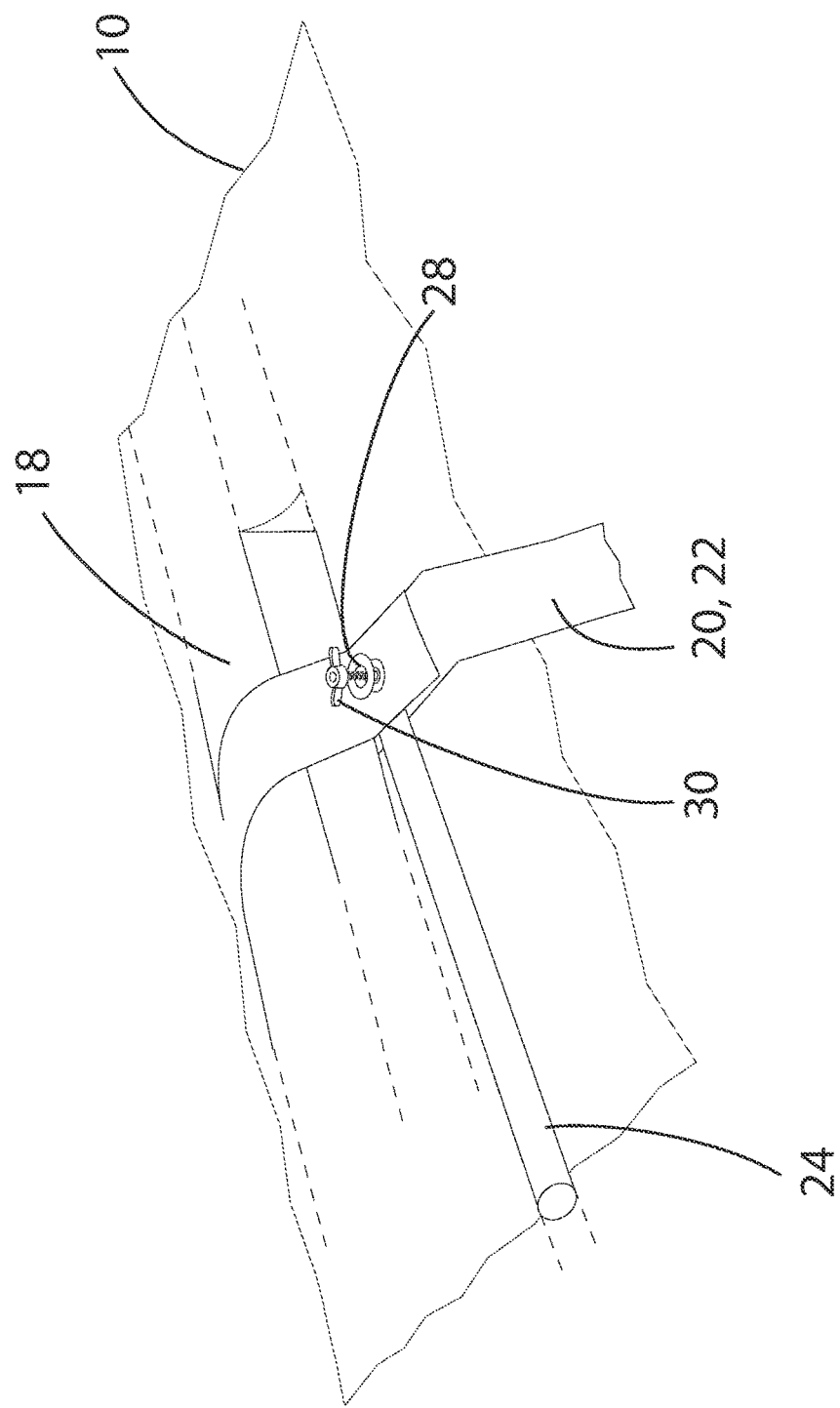

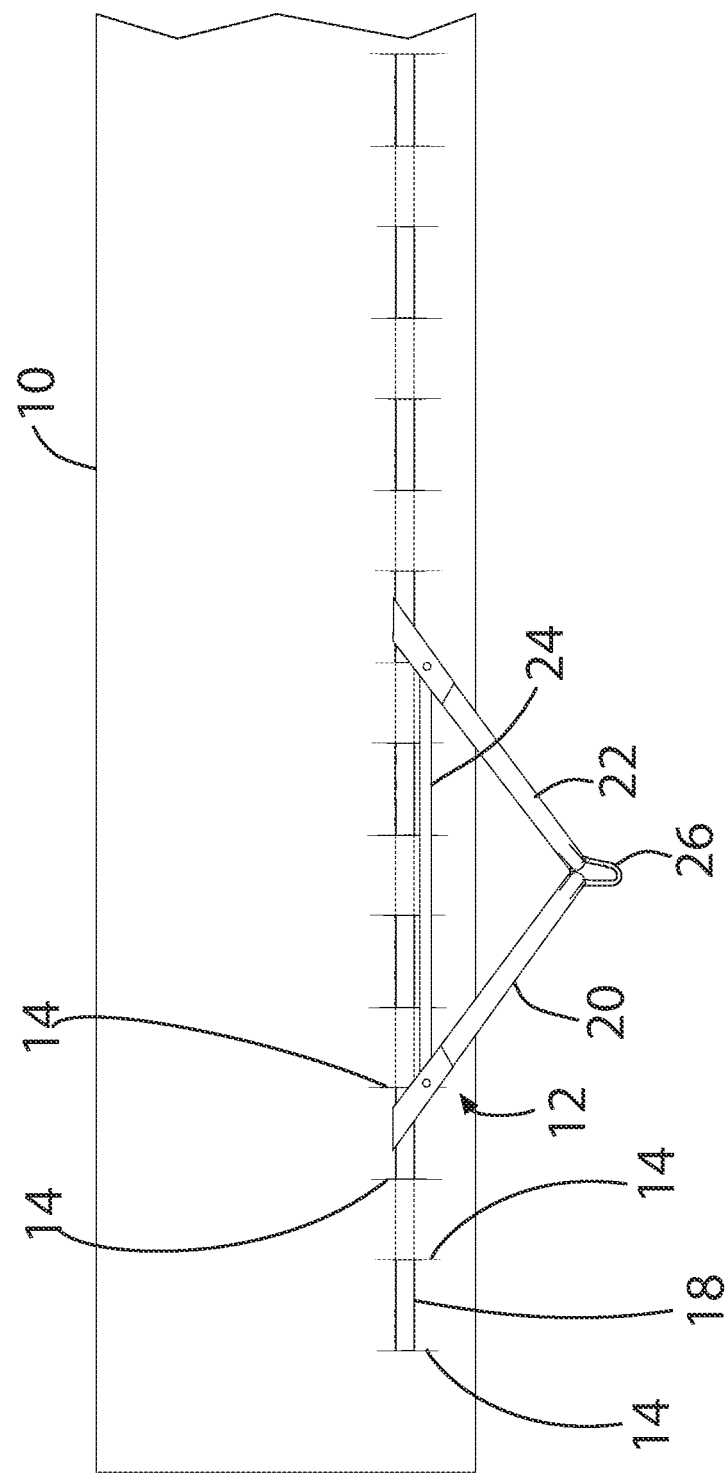

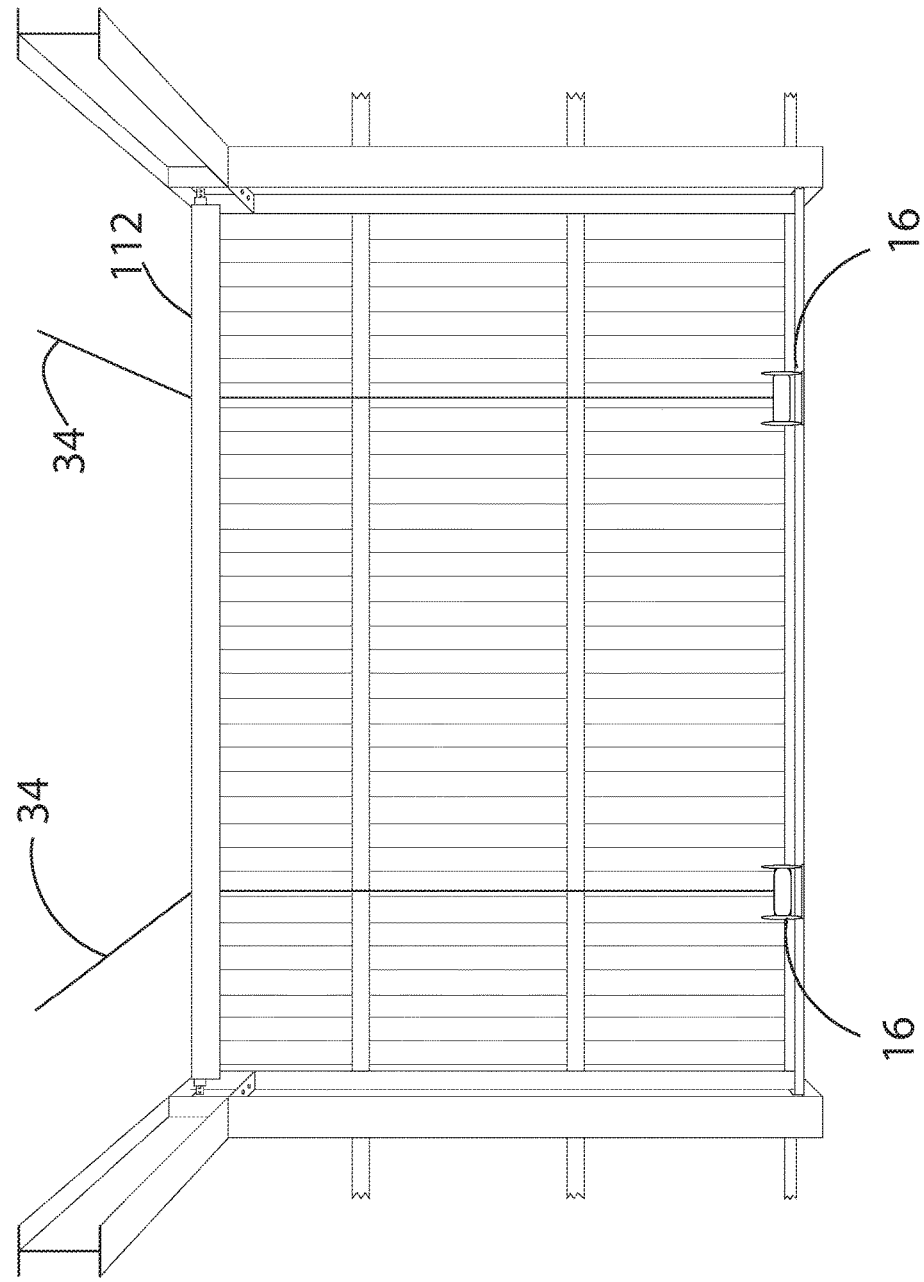

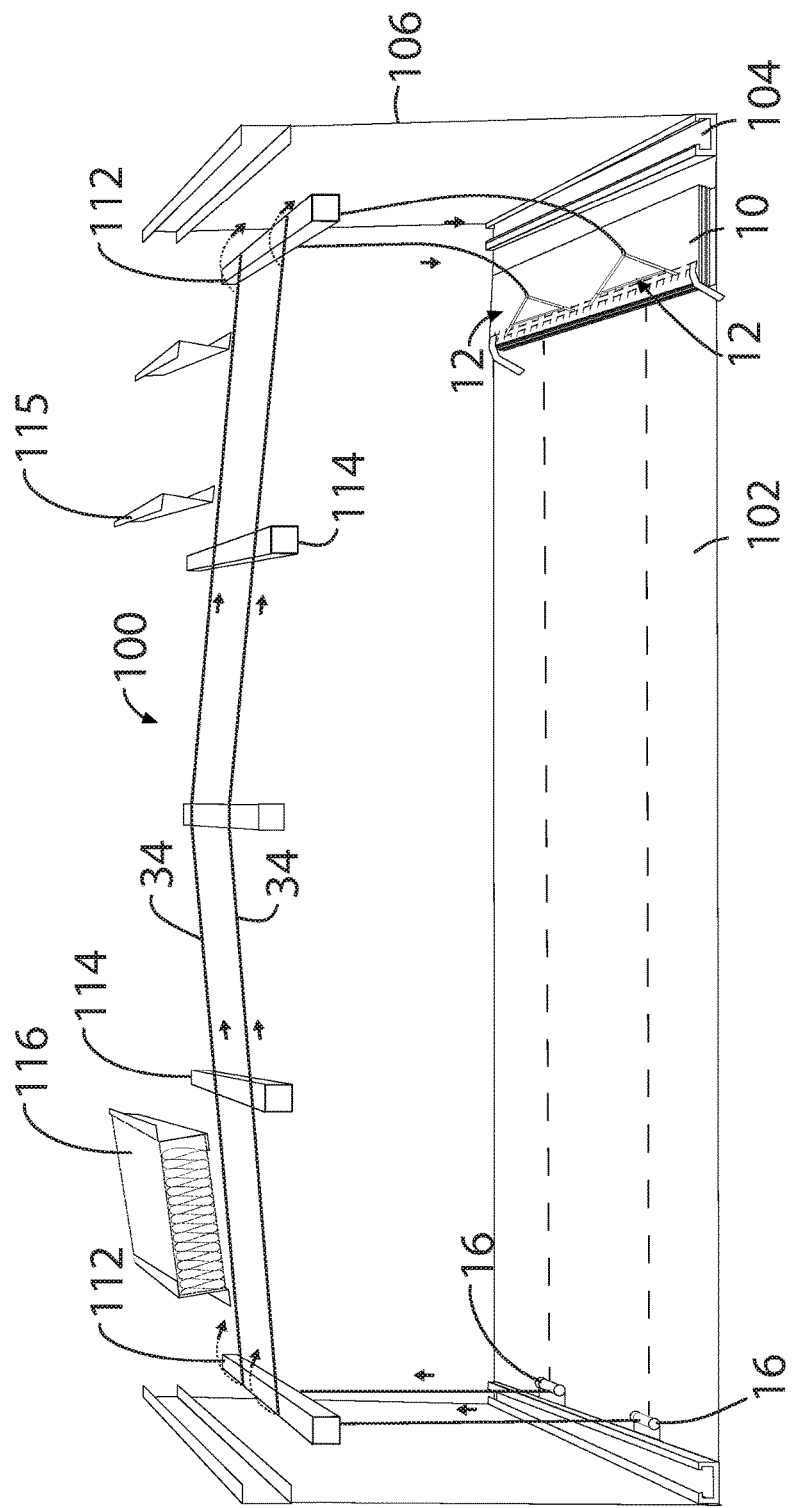

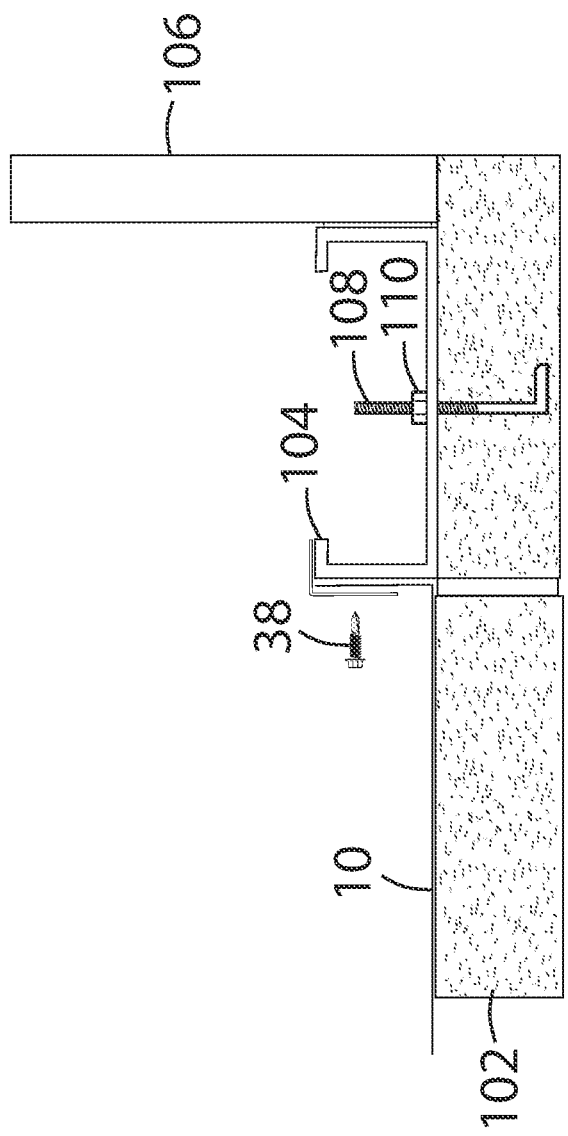

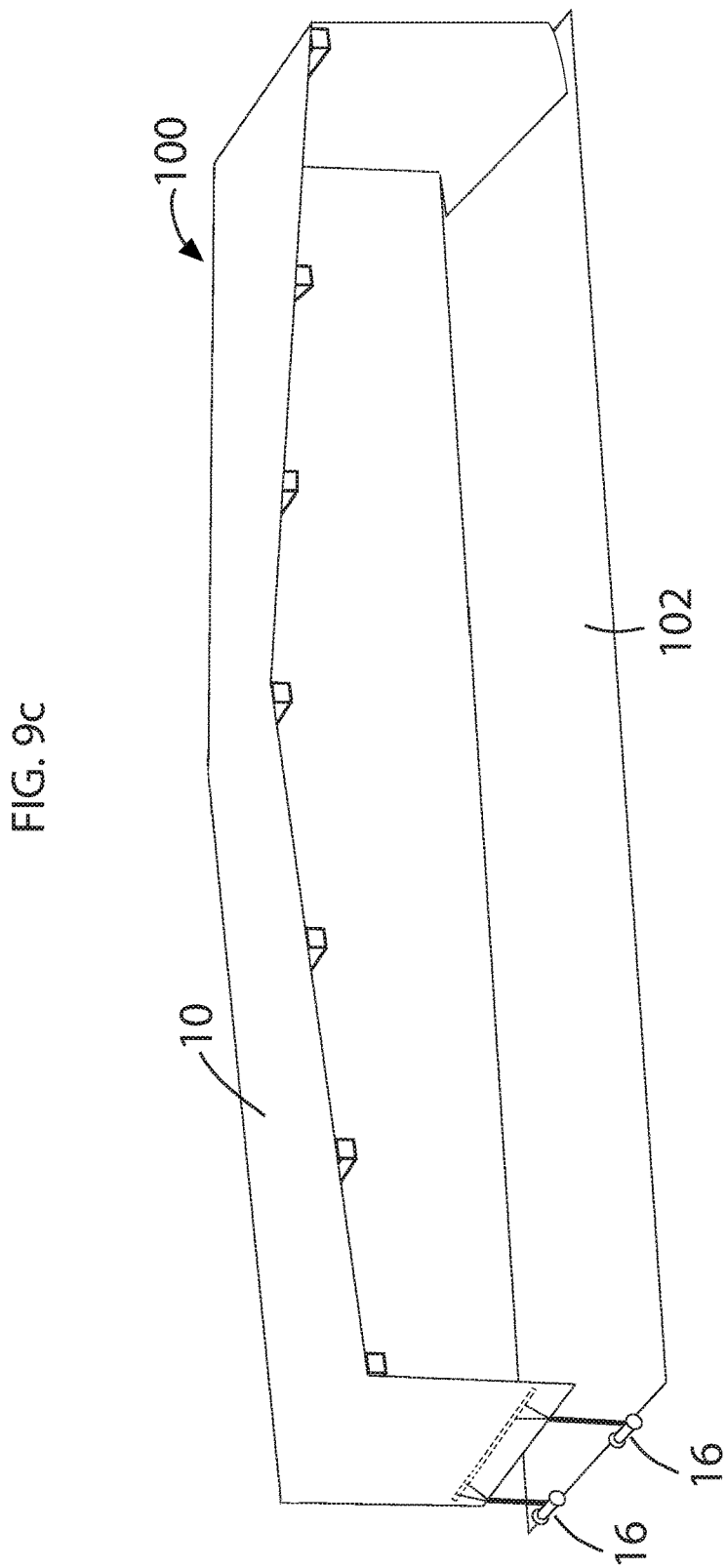

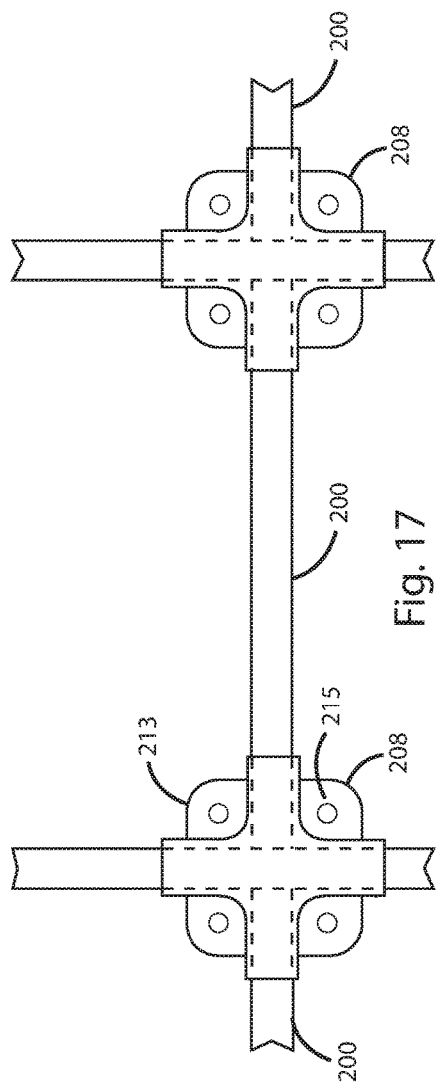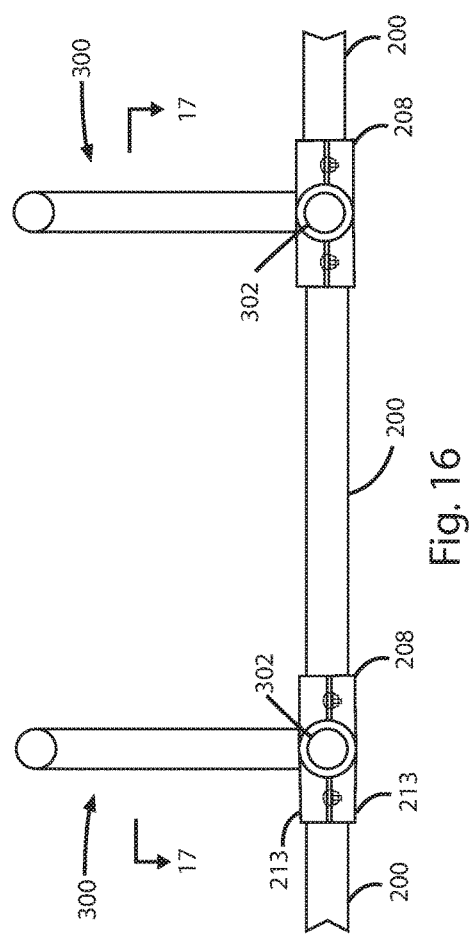

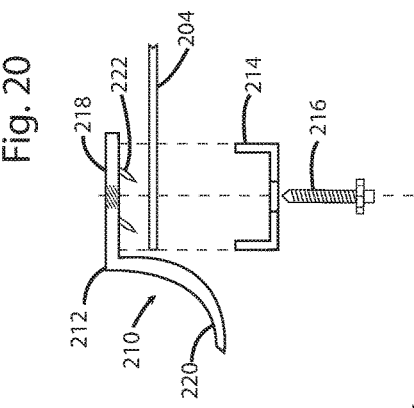
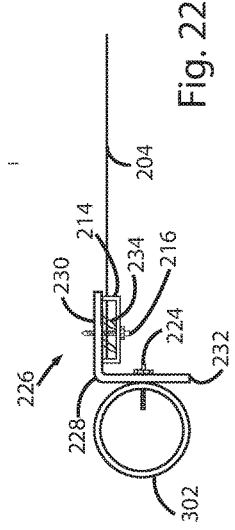
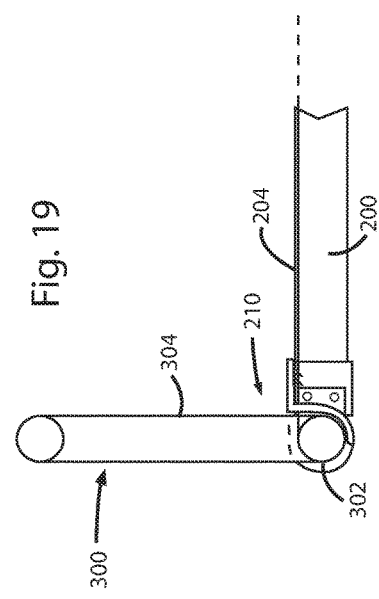
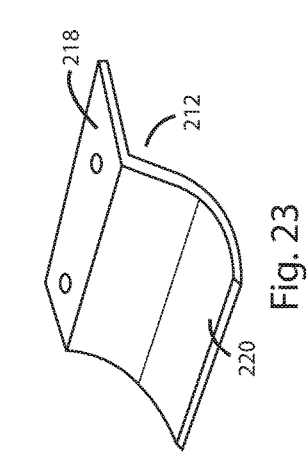

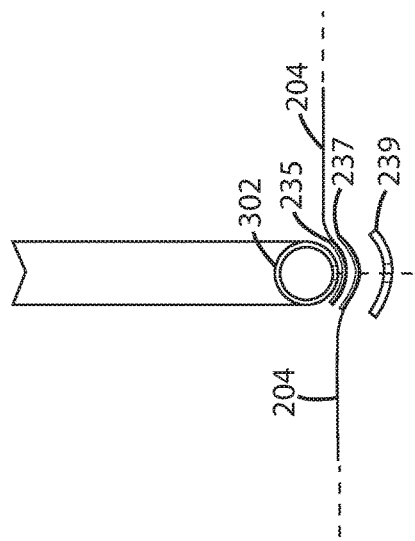
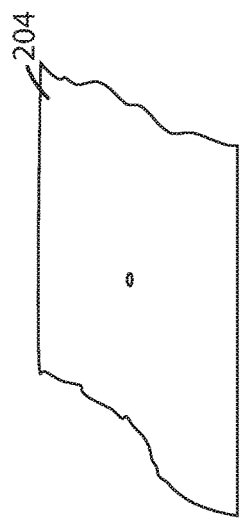
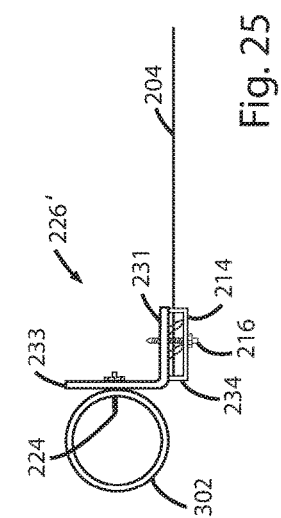
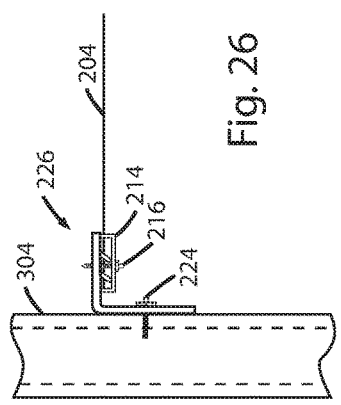

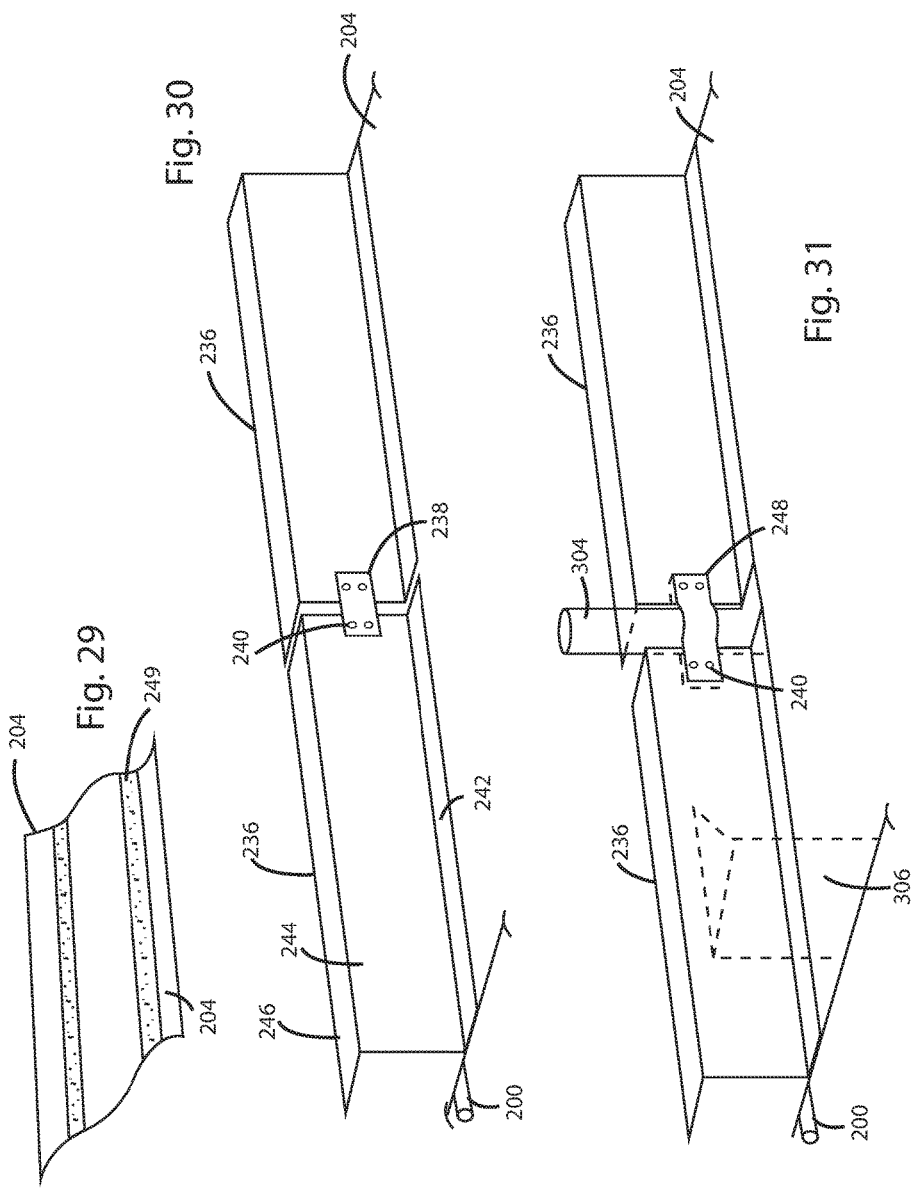

INSULATION SYSTEM FOR PORTABLE BUILDINGS

CROSS-REFERENCES TO RELATED APPLICATIONS

This continuation in part patent application claims the benefit of patent application Ser. No. 15/249,528, filed on Aug. 29, 2016.

BACKGROUND OF THE INVENTION

Field of the Invention

The present invention relates generally to buildings and more specifically to an insulation system for portable buildings, which prevents the gradual migration of insulation materials down a slope of the portable building roof and walls.

Discussion of the Prior Art

It appears that the prior art does not teach or suggest a method of pulling a sheet of flexible material. U.S. Pat. No. 1,106,624 to Cadwallader et al. discloses a protective covering for orchards. U.S. Pat. No. 4,259,819 to Wemyss discloses a method and apparatus for anchoring sheet material to a framework.

Portable buildings, also known as temporary buildings, are a relatively new type of structure made from supporting structural frames with a strong, flexible fabric material pre-fabricated to be installed over the exterior of the structural framework to provide a weather proof exterior skin. The portable buildings are generally designed for short-term use of a few years, however there is a growing tendency to continue to use these structures for longer periods of time of many years. The uses of the portable buildings has also expanded to more sophisticated uses such as manufacturing, arenas, sports facilities, etc. The portable buildings are engineered, manufactured and sold as prefabricated kits of components for erecting structures. Some manufacturers have also designed inner fabric ceiling for aesthetics and heat conservation, however there has not been a good reliable system of achieving higher thermal resistance with affordable insulation.

One problem with insulating the portable buildings is that generally the structural systems and the flexible fabrics employed are subject to significant movement due to the nature of the materials used and the limited purposes for which the buildings are initially intended. The movement is primarily from wind forces on the portable buildings. Other movement is the deflection of flexible fabric materials used for the exterior covers and the interior aesthetic ceilings. The portable building requires that sufficient slopes be designed into the exterior coverings to repel rain water and potentially snow accumulation. The problems of insulating portable buildings is that the weight of the traditional insulation material required to achieve minimum energy conservation code compliance causes excessive deflection in the flexible materials without a structural design to control the deflection within desirable limits. The movement of the portable buildings with their rather significant roof slopes, due to wind forces, causes the entire building to shake and move sufficiently that insulation materials placed on the aesthetic flexible fabric ceiling systems tend slide down the slope, thus resulting in gaps in the insulation. Shifting insulation down the slopes also results accumulation of excess weight down-slope, which increases the deflection of the aesthetic flexible fabric ceiling materials. In some designs, such as arched portable buildings, there are no walls as the roof arch terminates at the floor level or on an elevated foundation.

Accordingly, there is a clearly felt need in the art for an insulation system for portable buildings, which limits deflection to acceptable levels and also prevents the gradual migration of insulation materials down a slope of the portable building roof and walls.

SUMMARY OF THE INVENTION

A method of pulling a sheet of flexible material includes forming a row of a plurality of lengthwise slits, near an end of a sheet of material; providing at least one pull device; and providing at least one cable winch. Each slit is substantially parallel to a length of the sheet of material and the row of the plurality of lengthwise slits are substantially perpendicular to a length of the sheet of material. The slits are long enough to allow insertion of a cross section of a tubular pull rod through at least substantially all of a width of the sheet of material. A pull device preferably includes a first pull strap, a second pull strap, a spreader bar and a strap ring. However, other designs of pull devices may also be used. One end of the first and second pull straps is secured to the strap ring. Preferably, a threaded fastener is retained near the other end of the first and second straps. A fastener hole is formed in the other end of the first and second straps. A fastener hole is formed through each end of the spreader bar. The threaded fasteners of the first and second pull straps are inserted through the fastener holes in each end of the spreader bar. The first and second straps are wrapped around the tubular pull rod. The threaded fastener in the first and second straps are inserted through the fastener hole in the other end of the first and second straps. A wing nut or the like is threaded on to the threaded fastener to retain the spreader bar and the other end of the first or second strap. A first pull device is used near a first side of the sheet of material and a second pull device is used near a second side of the sheet of material.

The at least one winch is secured to the floor on one side of the building. The sheet of material is laid on the floor at an opposing side of the building. The at least one pull device is secured to the tubular pull rod. An end of the cable from the at least one winch is pulled over an inside corner strut on the one side of the building; over a plurality of support struts; and over an inside corner strut on the opposing side of the building. An end of the cable is secured to the strap loop of the pull device. The at least one winch is rotated to pull the sheet of material over the two inside corner struts and the plurality of support struts. Once the sheet of flexible material is fully pulled over the plurality of struts, preferably a sticky tape is applied to an area of the sheet of flexible material on top of each corner strut. A metal right angle or half pipe may be applied to a top of the sticky tape and the metal right angle or half pipe is secured to the corner strut with a plurality of self-drilling fasteners.

The present invention provides an insulation system for portable buildings, which prevents insulation from sliding down inclined roofs and walls. Portable buildings are designed with frames made up of rafters and columns. The rafter ends or column have a means of attaching their base ends to piling style concrete piers, concrete foundations or massive concrete surface weights, which are sufficient to absorb the wind forces exerted on the building. The rafter and columns designs are singular members for short spans and multiple parallel tubes attached together with multiple welded cross braces to form truss styles for longer spans. The tube rafters may be used as simple arches by themselves as frame members or may be joined to the ends of one or more columns that are attached at their bases to form a single frame. Two or more frames in parallel are typically used to support the exterior flexible sheet material.

The building structural frames are typically made of welded tubes fabricated from steel or aluminum, which span the building widths from sidewall to sidewall. Larger spans of the tube style frames require intermediate structural joints to achieve the wide spans. The structural joints are typically metal end plates with matching aligned bolt-holes. Bolts and nuts are typically used to bolt the end plates of the two the adjacent frame parts. Tubes with attachment plates are typically attached perpendicular to and between the frames to rigidly hold the frames apart, and also to provide bracing to the frames to prevent axial twisting and lateral bending of the structural frames. Cross bracing may also be attached between the rafters to make the frames rigid. The exterior surface area in the plane of the exterior frame members, between a pair of adjacent frames is defined as a building roof or wall bay. A flexible fabric piece is prefabricated to span between two adjacent frames in one continuous piece for the length of the building arch or rafter.

Large pieces of the flexible fabric material are prefabricated to be stretched over the exterior of the frames and anchored to the sidewall base with tie down straps with various terminal attachment means such strap loops with a metal hooks and tensioning devices. The exterior flexible fabric material is typically pulled taut from the two adjacent side edges between the frames as the flexible fabric sheet is pulled across the building width. One method is to adapt the exterior side edges along the sides of the frames with a special groove, which will receive and hold the flexible fabric material inside the groove. The flexible fabric material is prefabricated with two enlarged side edges, which fit into the frame grooves by sliding the enlarged flexible fabric side edge into the ends of the two adjacent rafter grooves. This process requires significant force to be applied to pull the flexible fabric material across the building width, because the flexible fabric material is fabricated to fit taut between the two adjacent frame grooves as it is installed by pulling the two side edges of the flexible fabric materials simultaneously into the frame groove. A lubricant may be used in the frame grooves to reduce friction caused by the taut flexible fabric material pulled into the frame grooves of the two adjacent parallel frames or rafters.

The tensioning of the pre-fabricated, flexible fabric material between the adjacent frames is required to have the full span of the flexible fabric material not to be in contact with the structural bracing between the adjacent frames of the building bay. This design is desired to prevent the wind forces on the exterior flexible material from causing abrasion damage on the flexible fabric material from rubbing on the structural bracing. The structural bracing of these building is typically installed below the plane of the exterior flexible fabric, a minimum distance to prevent physical contact. Some designs may allow such physical contact, but with special abrasion resistant padding material on the exterior side of the structural braces to minimize abrasion wear and to extend the useful life of the flexible fabric exterior covering.

Interior flexible fabric ceilings for aesthetic purposes may be installed similarly to the exterior flexible fabric coverings spanning the bays between the rafters or frames. However the portable building design does not provide sufficient structural strength to support the weight of insulation materials installed on them within an acceptable limit of deflection. Accordingly, there is a need for a system and method of installation of a flexible fabric ceiling system with sufficient structural strength to support the weight of superimposed thermal insulation within desirable deflection limits.

The present invention is a structural system, which uses struts to span adjacent to the interior surface of the arched rafters or frames, which are rafters utilizing columns to support them, to support the flexible fabric ceiling with superimposed insulation. The struts are attached adjacent to a bottom of the rafters or frames with clamps or welded clips bolts or any suitable attachment means. Additionally, the flexible fabric buildings typically have movement resulting from wind forces on the building exteriors. This movement will result in the insulation gradually migrating down smooth surfaces of the flexible fabric ceilings, both down toward deflected areas and also down a slope of the flexible fabric ceiling and walls, which attach adjacent to the inward facing surfaces of the arched rafters and frames. Accordingly, there needs to be structural members placed between the rafters or frames adjacent the outward surface of the flexible fabric ceiling to prevent the insulation from moving down the slopes. Slide prevention members spanning between the rafters and frames are preferably used to prevent the insulation from sliding down the slopes resulting in gaps in the insulation.

Another structural option to prevent the insulation from sliding down the slope of the fabric ceiling would be to apply a liquid adhesive on the outer surface of the ceiling sheet for use with preformed batt insulation or applied within the insulation such as within various types of blow-in insulation, such as fiberglass, with has sufficient open time to allow the insulation to be placed on the fabric ceiling sheet where the adhesive then sets up to form one continuous layer adhered to the outward, exterior facing side of the flexible ceiling fabric material.

The insulation system for portable buildings requires the struts to be installed spanning between the rafters or frames at spacing locations sufficient to control the deflection with a desirable distance. The struts are attached using any suitable attachment means. The flexible fabric is provided in an overall size to be pulled across the full width of the building in one continuous piece and to cover the distance between the adjacent rafters or frames. It would be possible to create a field splicing procedure to join two or more pieces together, end-to-end, in very wide buildings. The flexible fabric ceiling material is pulled across the building width manually or by using winches with cables or straps to pull the ceiling over the support struts. One end of the flexible sheet is attached to a first termination structural member, which may be a strut, foundation or other structural member. The flexible fabric ceiling is pulled taut and fastened in tension at the second termination structural member. Each side edge of the flexible fabric ceiling is connected to the adjacent rafter or the adjacent flexible fabric ceiling edge to support the edge(s) of the flexible fabric ceiling. Next, insulation is blown or otherwise positioned on the outward facing side of the flexible fabric ceiling material to complete the installation in one bay.

Accordingly, it is an object of the present invention to provide an insulation system for portable buildings, which limits deflection to acceptable levels and also prevents the gradual migration of insulation materials down a slope of the portable building roof and walls.

These and additional objects, advantages, features and benefits of the present invention will become apparent from the following specification.

BRIEF DESCRIPTION OF THE DRAWINGS

FIG. 1 is a top view of a sheet of flexible material with two pull devices engaged therewith of a method of pulling a sheet of flexible material in accordance with the present invention.

FIG. 2 is an enlarged perspective view of a tubular pull rod inserted through slits in a flexible material and a pull strap secured to the tubular pull rod of a method of pulling a sheet of flexible material in accordance with the present invention.

FIG. 3 is an enlarged top view of a sheet of flexible material with a pull device engaged therewith of a method of pulling a sheet of flexible material in accordance with the present invention.

FIG. 6 is a front view of one side of the building with two winches retained on a floor of a method of pulling a sheet of flexible material in accordance with the present invention.

FIG. 7 is a perspective side view of a method of pulling a sheet of flexible material with two winches located adjacent one side wall; two cables extending from the two winches over a plurality of struts; and coupled to a sheet of flexible material in accordance with the present invention.

FIG. 8 is an end view of one end of a sheet of flexible material before temporarily attachment to a base channel of a method of pulling a sheet of flexible material in accordance with the present invention.

FIG. 9c is a perspective view of a method of pulling a sheet of flexible material with two winches located adjacent one side wall; two cables extending from the two winches; coupled to a sheet of flexible material; and the sheet of flexible material pulled adjacent a bottom of a wall on one side of the building in accordance with the present invention.

FIG. 16 is a front view of two adjacent curved rafters of a portable building illustrating the attachment of three tube struts in-line with bottom support tubes of the two adjacent curved rafters with two in-line cross tube clamps in accordance with the present invention.

FIG. 17 is a top view of two adjacent curved rafters of a portable building illustrating the attachment of three tube struts in-line with bottom support tubes of the two adjacent curved rafters with two in-line cross tube clamps in accordance with the present invention.

FIG. 19 is a front view of a ceiling sheet retained by hooks of a sheet bracket and attached to a rafter of a portable building in accordance with the present invention.

FIG. 20 is an enlarged exploded end view of a sheet bracket, a ceiling sheet and a sheet clamp bracket for securing the ceiling sheet to a rafter of a portable building in accordance with the present invention.

FIG. 21 is an end view of a sheet bracket secured to a rafter of a portable building and a ceiling sheet secured to the sheet bracket with channel clamp in accordance with the present invention.

FIG. 22 is an end view of a ceiling sheet retained by hooks of a second embodiment of a sheet bracket and attached to a rafter of a portable building in accordance with the present invention.

FIG. 23 is a perspective view of a sheet bracket of an insulation system for a portable building in accordance with the present invention.

FIG. 24 is a perspective view of a sheet clamp of an insulation system for a portable building in accordance with the present invention.

FIG. 25 is an end view of a ceiling sheet retained by hooks of a third embodiment of a sheet bracket and attached to a bottom support tube of a curved rafter of a portable building in accordance with the present invention.

FIG. 26 is an end view of a ceiling sheet retained by hooks of a second embodiment of a sheet bracket and attached to an upright support tube of a curved rafter of a portable building in accordance with the present invention.

FIG. 27 is a partially exploded end view of a first ceiling sheet tacked to a bottom of a bottom support tube of a rafter with a first double sided tape portion, a second ceiling sheet tacked to a bottom of the first ceiling sheet with a second double sided tape portion and a curved plate secured to the bottom support tube with a curved plate of and a plurality of fasteners of an insulation system for a portable building in accordance with the present invention.

FIG. 28 is a perspective exploded view of a ceiling sheet and an insulation stick pin device for insertion through the ceiling sheet to retain a quantity of insulation of an insulation system for a portable building in accordance with the present invention.

FIG. 29 is a perspective a ceiling sheet with adhesive applied to a top thereof to retain a quantity of insulation of an insulation system for a portable building in accordance with the present invention.

FIG. 30 is a perspective view of two adjacent insulation stop brackets attached to each with a splice plate and located above a ceiling sheet of an insulation system for a portable building in accordance with the present invention.

FIG. 31 is a perspective view of two adjacent insulation stop brackets attached to each with an offset splice plate and located above a ceiling sheet of an insulation system for a portable building in accordance with the present invention.

DETAILED DESCRIPTION OF THE PREFERRED EMBODIMENTS

Figure 5:
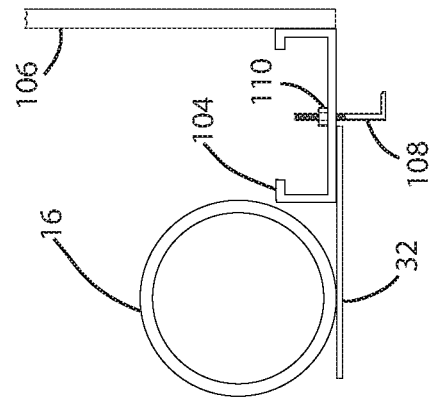
FIG. 5 is an end view of a base plate of a winch retained under a base channel of a method of pulling a sheet of flexible material in accordance with the present invention.
Figure 4:
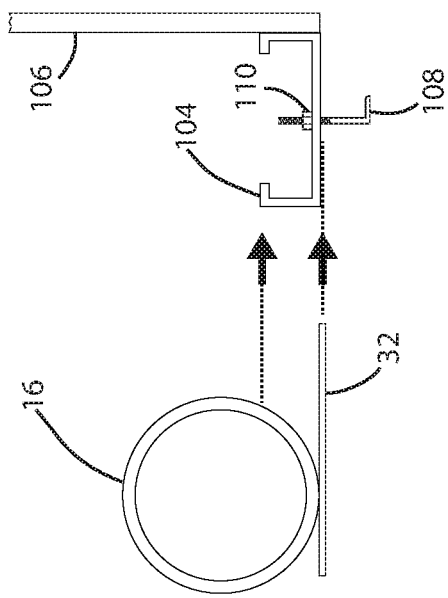
FIG. 4 is an end view of a winch before thereof is inserted under a base channel of a method of pulling a sheet of flexible material in accordance with the present invention.

With reference now to the drawings, and particularly to FIG. 1, there is shown a top view of a sheet of flexible material 10 with two pull devices 12 engaged therewith of a method of pulling a sheet of flexible material. With reference to FIGS. 2-6, the method of pulling a sheet of flexible material preferably includes forming a row of a plurality of lengthwise slits 14, near an end of the sheet of flexible material 10; providing the at least one pull device 12; and providing at least one cable winch 16. Each slit 14 is substantially parallel to a length of the sheet of material 10 and the row of the plurality of lengthwise slits 14 are substantially perpendicular to a length of the sheet of material 10. Each slit is long enough to allow insertion of a cross section of a tubular pull rod 18 through substantially a width of the sheet of material 10. The pull device 12 preferably includes a first pull strap 20, a second pull strap 22, a spreader bar 24 and a strap ring 26. One end of the first and second pull straps 20, 22 are secured to the strap ring 26. However, the first pull strap, the second pull strap 22 and the strap ring 26 could be replaced with a single strap or cable, or may be eliminated if the pull cable 34 is coupled directly to the pull rod 18, but with the results of less control and strength.

Preferably, a threaded fastener 28 is retained near the other end of the first and second straps 20, 22. A fastener holes (not shown) are formed in the other ends of the first and second straps 20, 22 to receive the threaded fastener 28. A fastener hole (not shown) is formed through each end of the spreader bar 24 to receive the two threaded fasteners 28. The two threaded fasteners 28 are inserted in two holes (not shown) formed through distal ends of the first and second pull straps 20, 22 and are inserted through the fastener holes in each end of the spreader bar 24. The one end of the first and second straps are wrapped around the tubular pull rod 18. The threaded fastener 28 in the first and second straps 20, 22 and through the spreader bar are inserted through the fastener holes in the distal end of the first and second straps 20, 22. A wing nut 30 or the like is threaded on to the threaded fastener 28 to secure the spreader bar 24 to the other end of the first or second strap 20, 22. It is possible to pull the sheet of flexible material 10 with only one pull device 12. However, two spaced apart pull devices 12 allow for directional control, left or right of the sheet of flexible material 10. Preferably, the first pull device 12 is used near a first side of the sheet of flexible material 10 and the second pull device 12 is used near a second side of the sheet of material 10.

With reference to FIGS. 6-8, a base channel 104 is secured to a floor 102 of a building 100, adjacent a wall 106 with a plurality of lag bolts 108 or the like. Each winch 16 includes a base plate 32 and a cable 34. A nut 110 of the lag bolt 108 is loosened to allow the base channel 104 to be lifted to allow insertion of the base plate 32 of the winch 16, under the base channel 104. The nut 110 is tightened to secure the winch 16. The two winches 16 are preferably positioned, such that a middle of each winch 16 is located approximately one-fifth of a width of the sheet of flexible material 10 from an edge of the sheet of flexible material 10. The sheet of flexible material 10 is laid on the floor 102 at an opposing side of the building 100 from the two cable winches 16. The at least one pull device 12 is secured to the tubular pull rod 18. The other end of the flexible sheet of material 10 is temporarily secured to the base channel 104 with a metal angle 36 and a plurality of self-drilling screws 38. The two cables 34 are pulled over an inside corner strut 112 on a winch side of the building 100; over a plurality of support struts 114; and over an inside corner strut 112 on the opposing side of the building 100. An end of the cable 34 is secured to the strap ring loop 26 of the pull device 12.

Figure 9A:
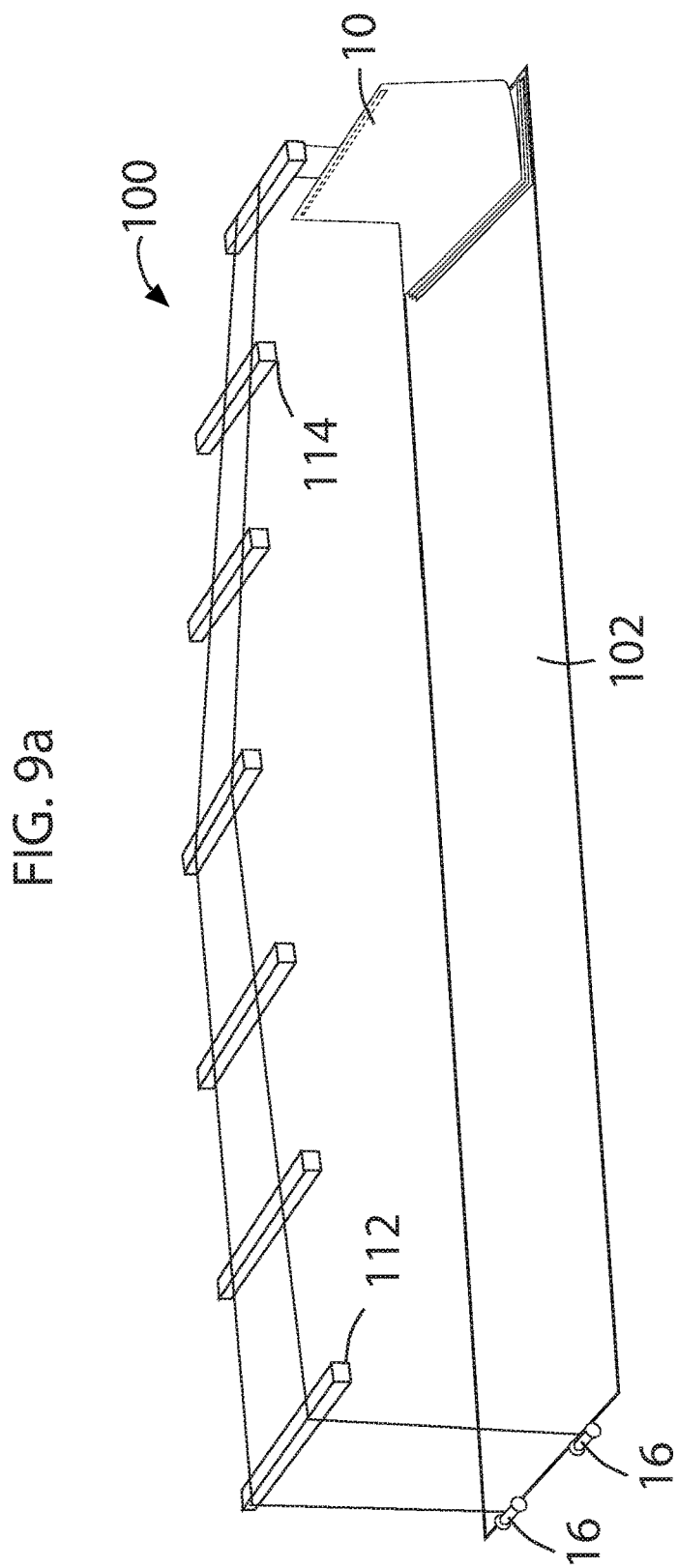
FIG. 9a is a perspective side view of a method of pulling a sheet of flexible material with two winches located adjacent one side wall; two cables extending from the two winches; coupled to a sheet of flexible material; and the sheet of flexible material partially pulled up a side wall in accordance with the present invention.
Figure 9B:
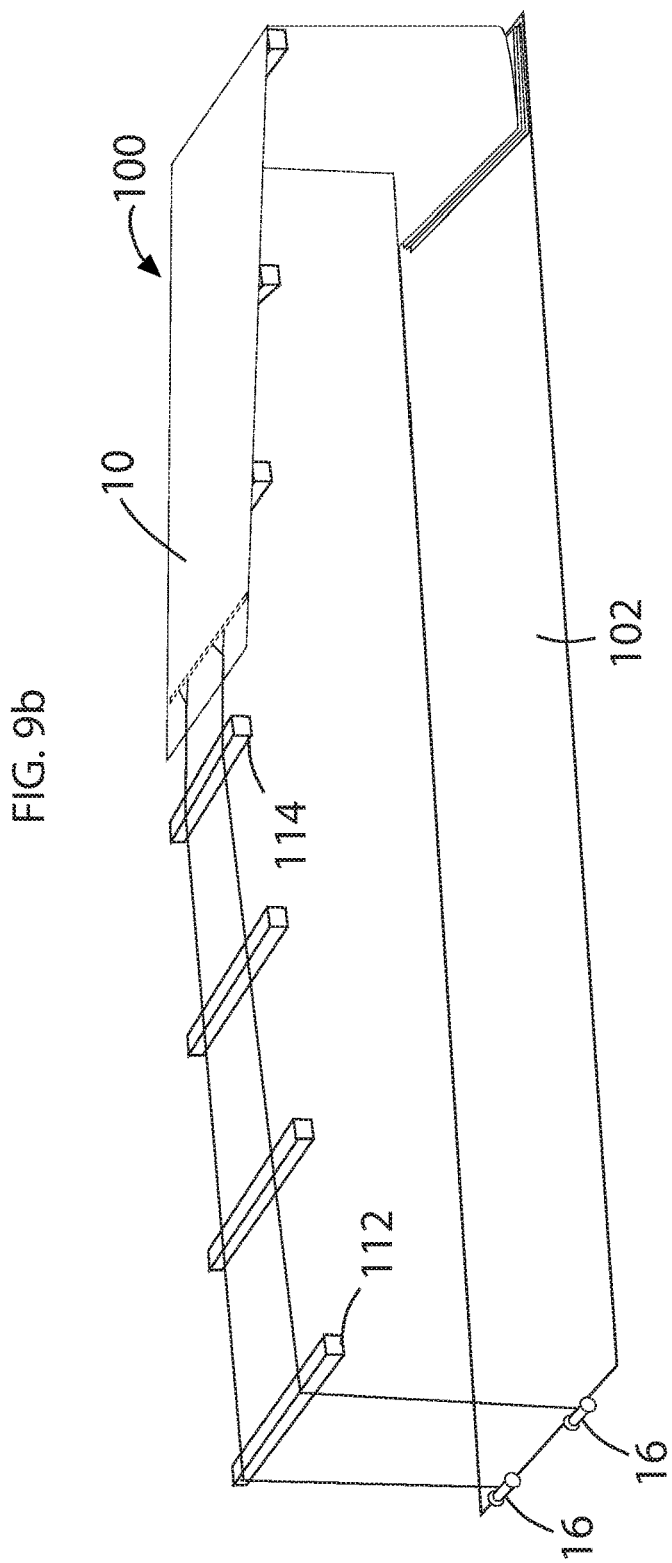
FIG. 9b is a perspective view of a method of pulling a sheet of flexible material with two winches located adjacent one side wall; two cables extending from the two winches; coupled to a sheet of flexible material; and an end of the sheet of flexible material located adjacent a middle of a roof in accordance with the present invention.
Figure 10:
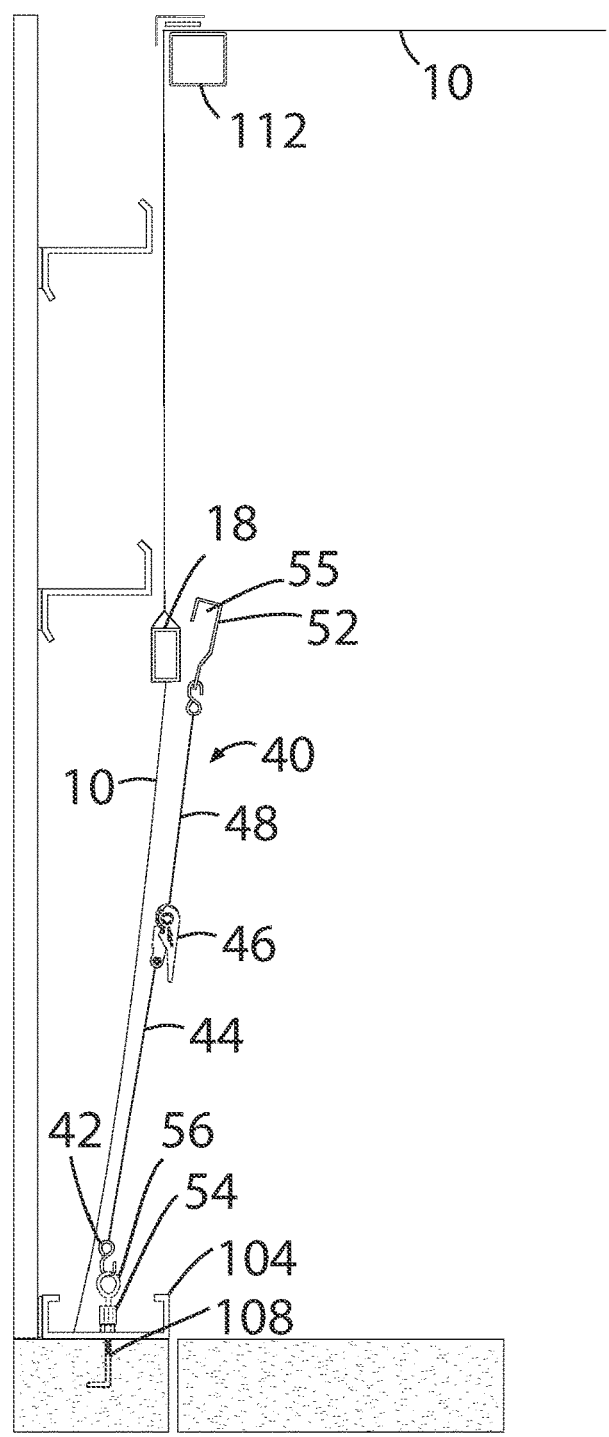
FIG. 10 is a side view of a tensioning device with one end secured to a lag bolt and the other end adjacent a tubular pull rod of a method of pulling a sheet of flexible material in accordance with the present invention.
Figure 11:
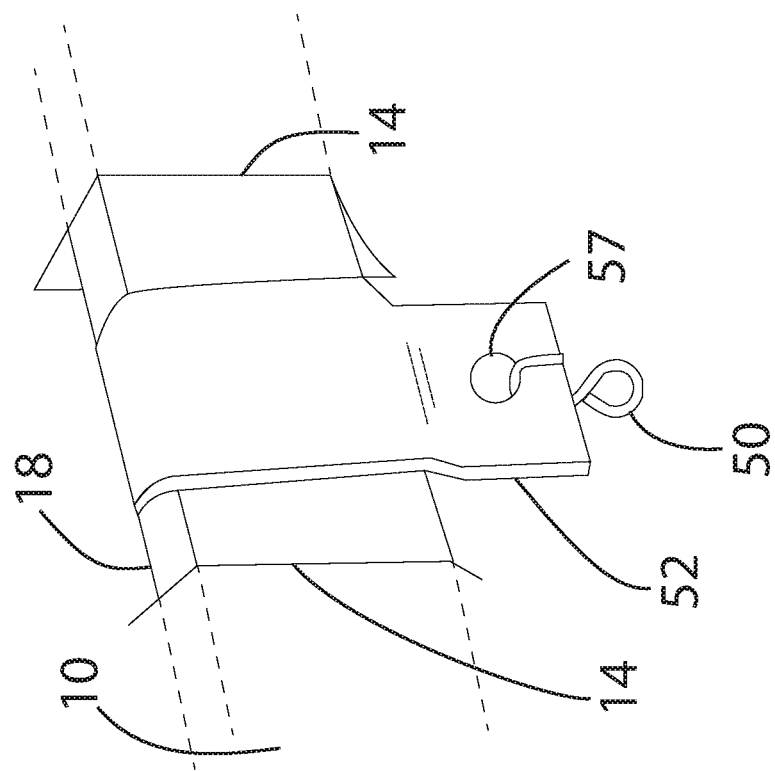
FIG. 11 is a perspective view of a rod hook of a tensioning device secured to a tubular pull rod of a method of pulling a sheet of flexible material in accordance with the present invention.

With reference to FIGS. 9a-9c, the two winches 16 are rotated to pull the sheet of flexible material 10 over the two inside corner struts 112 and the plurality of support struts 114. The pull device 12 is secured to the tubular pull rod 18 and pulled with the cable 34 by rotating the two winches 16. The two winches 16 may be used to pull the sheet of flexible material 10 taut, but for more uniform tension it is preferred to use multiple tensioning devices 40. With reference to FIG. 9c, once the end of the sheet of flexible material 10 is pulled near the floor 102, at least one tensioning device 40 is used to pull the sheet of flexible material 10 taut. With reference to FIGS. 10-11, the tensioning device 40 includes a first end hook 42, a first line 44, a ratchet device 46, a second line 48, a second end hook 50 and a pull rod hook 52. A threaded coupler 54 is threaded on to the lag bolt 108. An eye bolt 56 is threaded into the threaded coupler 54. One end of the first line 44 is secured to the first end hook 42 and the other end of the first line 44 is secured to one end of the ratchet device 46. One end of the second line 48 is secured to the other end of the ratchet device 46 and preferably the other end of the second line 48 is secured to the second end hook 50. The pull rod hook 52 includes an inner width 55, which is sized to receive a thickness of the tubular pull rod 18. The second end hook 50 is inserted into a hook hole 57 in a bottom of the pull rod hook 52. At least one tensioning device 40 is used to pull the sheet of flexible material 10 taut. The first end hook 42 is preferably retained in the eye bolt 56, but the first line 44 could also be secured to the base channel 104. The ratchet device 46 of the tensioning device 40 is operated to tension the sheet of flexible material 10 taut.

Figure 12:
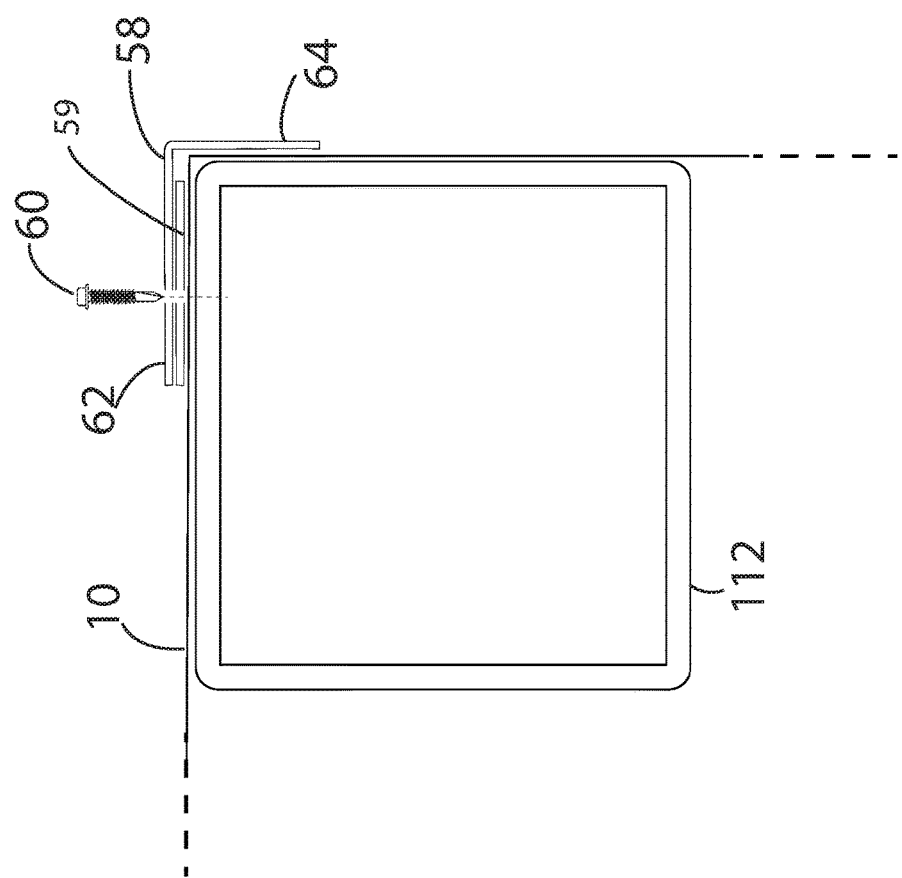
FIG. 12 is an end view of a sheet of flexible material secured to a inside corner strut with a sticky tape, a metal right angle and a plurality of self-drilling screws of a method of pulling a sheet of flexible material in accordance with the present invention.

With reference to FIG. 12, the sheet of tensioned flexible material 10 is secured to the two inside corner struts 112 with a metal angle 58, sticky tape 59 and a plurality of self-drilling fasteners 60. The sticky tape 59 is a double sided tape. The sticky tape 59 is applied to a horizontal surface of the sheet of flexible material 10, adjacent a corner of the inside corner strut 112 or to a surface of the metal angle 58. The metal angle 58 includes a first leg 62 and a second leg 64. The first leg 62 is preferably longer than the second leg 64. The second leg serves to stiffen the metal angle 58 to attain a generally uniform pressure attachment to the sheet of flexible material 10 along the length of the secured metal angle 58, however other shapes may be used. An inside surface of the first leg 62 is applied to the sticky tape 59, while forcing the second leg 64 against a vertical portion of the inside corner strut 112.

Figure 13:
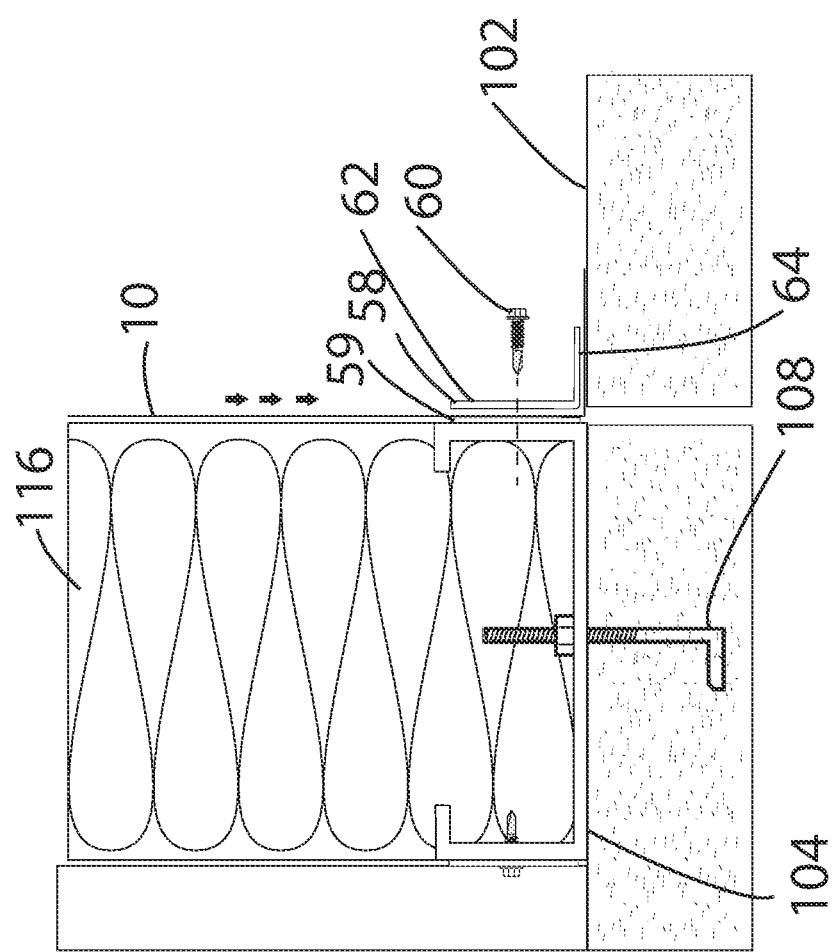
FIG. 13 is an end view of an end a sheet of flexible material before permanent attachment to a base channel with sticky tape, a metal angle and a plurality of self-drilling screws of a method of pulling a sheet of flexible material in accordance with the present invention.

With reference to FIGS. 7 and 9c, any suitable insulation 116 may be installed adjacent a plurality of purlins 115 and adjacent to a surface of the taut sheet of flexible material 10 of FIG. 9c. With reference to FIG. 13, the insulation 116 may be installed adjacent to a vertical surface of the taut sheet of flexible material 10. With reference to FIG. 13, each end of the sheet of flexible material 10 is secured to one of the base channels 104 with the metal angle 58, the sticky tape 59 and the plurality of self-taping fasteners 60. The sticky tape 59 is applied on one of an inside surface of the base channel 104, an outside surface of the sheet of flexible material 10 and an outside surface of the first leg 62, adjacent the floor 102. An outside surface of the first leg 62 is forced against one of the sheet of flexible material 10 and the sticky tape 58, while the second leg 64 is pushed against the sheet of flexible material 10 lying on the floor. The plurality of self-drilling fasteners 60 are threaded through the first leg 62 and into the base channel 104.

Figure 14:
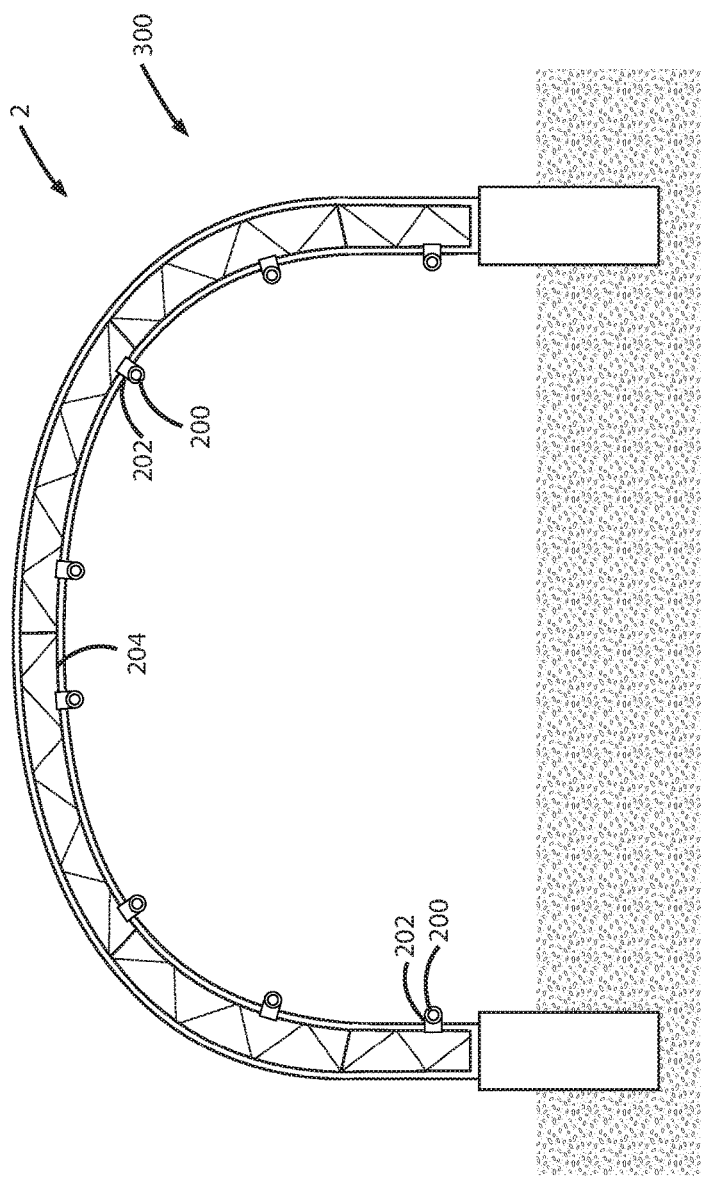
FIG. 14 is a side view of a curved rafter of a portable building with a plurality of struts attached to bottom support tube thereof with a plurality of cross tube clamps in accordance with the present invention.
Figure 15:
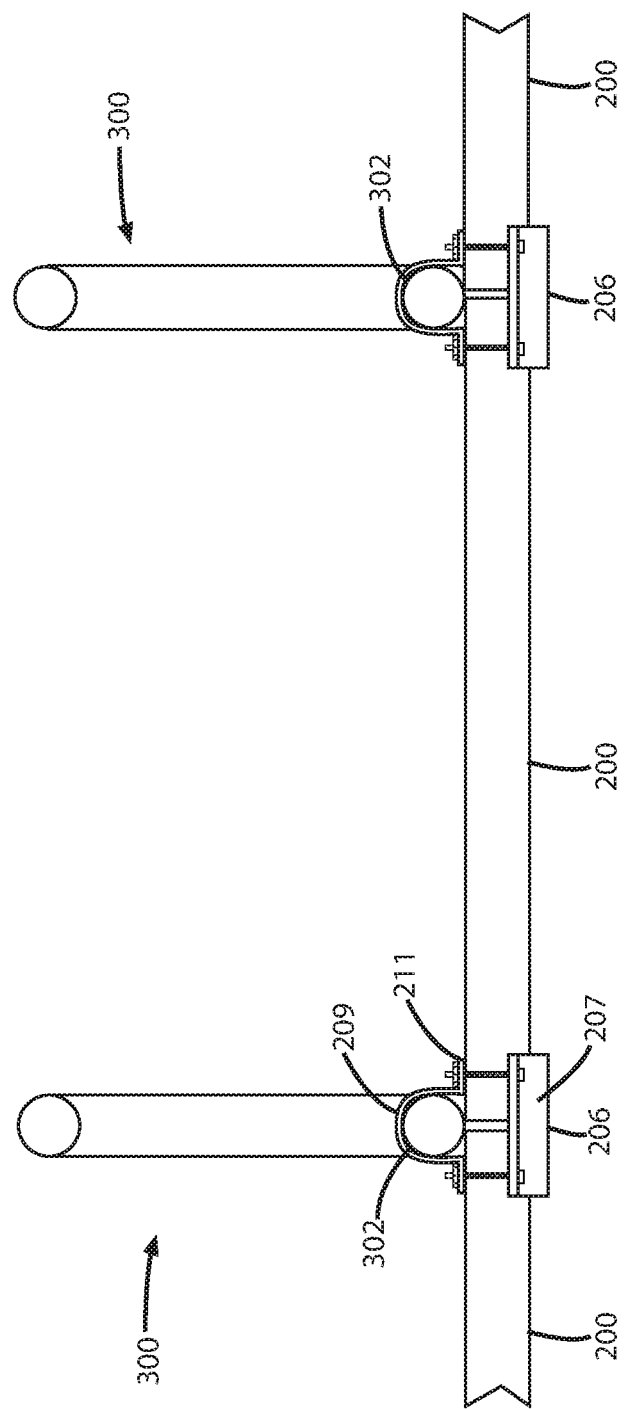
FIG. 15 is a front view of two adjacent curved rafters of a portable building illustrating the attachment of three tube struts to bottom support tubes of the two adjacent curved rafters with two cross tube clamps in accordance with the present invention.

With reference to FIGS. 14-15, an insulation system for portable buildings 2 preferably includes a plurality of support struts 200, a plurality of cross tube clamps 202 and a ceiling sheet 204. The support strut 200 is preferably a tube having a length, which is substantially equal to a distance between two adjacent rafters 300. Three support struts 200 are attached to bottom support tubes 302 of the two adjacent rafters 300 with two cross tube clamps 206. The cross tube clamp 206 includes a bottom plate 207, a top plate 209 and a plurality of fasteners 211. The bottom plate 207 receives two adjacent support struts 200. The top plate 209 receives the bottom support tube 302. The plurality of fasteners 211 are used to secure the bottom plate 207 to the top plate 209. The cross-tube clamps 206 are capable of clamping a lengthwise axis of the support struts 200 above or below the bottom support tubes 302.

Figure 18:
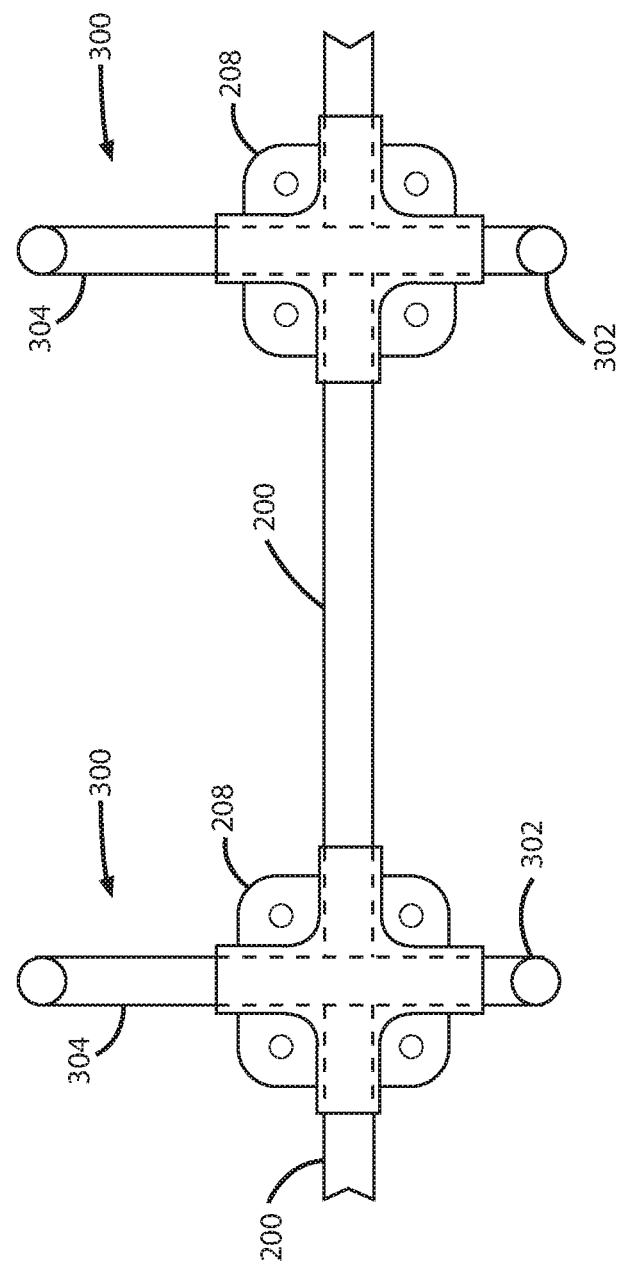
FIG. 18 is a front view of two adjacent curved rafters of a portable building illustrating the attachment of three tube struts to upright support tubes of the two adjacent curved rafters with two in-line cross tube clamps in accordance with the present invention.

With reference to FIGS. 16-17, three support struts 200 are attached to the bottom support tubes 302 of the two adjacent rafters 300 with two in-line cross tube clamps 208. The in-line cross tube clamps 208 clamp the support struts 200 on the same lengthwise axis as the lengthwise axis of the bottom support tubes 302. The cross tube clamp 208 includes two receiver plates 213 and a plurality of fasteners 215. The two receiver plates 213 receive the bottom support tube 302 and two adjacent support struts 200. The plurality of fasteners 215 are used to secure the two receiver plates to each other. With reference to FIG. 18, three support struts 200 are attached to upright support tubes 304 of the two adjacent rafters 300 with two in-line cross tube clamps 208.

With reference to FIGS. 19-24, opposing edges of the ceiling sheet 204 are attached to the bottom support tubes 302 of two adjacent rafters 300 with at least two sheet clamps 210. The sheet clamp 210 preferably includes a tube bracket 212, a channel clamp 214 and a plurality of fasteners 216. The tube bracket 212 includes a sheet retention member 218 and a curved tube member 220. The sheet retention member 218 extends outward from a top of the curved tube member 220. A plurality of barbs 222 extend downward from a bottom of the sheet retention member 218 to temporarily retain an edge of the ceiling sheet 204. The channel clamp 214 is used to secure the edge of the ceiling sheet 204 to the sheet retention member 218 by inserting the plurality of fasteners 216 through the channel clamp 214 and threading the plurality of fasteners 216 into the sheet retention member 218. The sheet clamp 210 is attached to the bottom support tube 302 with a plurality of fasteners 224.

With reference to FIG. 22, a second embodiment of a sheet clamp 226 includes a tube bracket 228, the channel clamp 214 and the plurality of fasteners 216. The tube bracket 228 includes a sheet retention member 230 and a tube member 232. The sheet retention member 230 extends outward from a top of the tube member 232. A plurality of barbs 234 extend downward from a bottom of the sheet retention member 230 to temporarily retain an edge of the ceiling sheet 204. The channel clamp 214 is used to secure the edge of the ceiling sheet 204 to the sheet retention member 230 by inserting the plurality of fasteners 216 through the channel clamp 214 and threading the plurality of fasteners 216 into the sheet retention member 230. The sheet clamp 226 is attached to the bottom support tube 302 with the plurality of fasteners 224. However, other devices besides the sheet clamps 210, 226 and 226' may be used to secure opposing edges of the ceiling sheet 204 to the bottom support tubes 302.

With reference to FIG. 25, a modified sheet clamp 226' includes a modified tube bracket 228', the channel clamp 214 and the plurality of fasteners 216. The modified tube bracket 228' includes a sheet retention member 231 and a tube member 233. The sheet retention member 231 extends outward from a bottom of the tube member 233. A plurality of barbs 234 extend downward from a bottom of the sheet retention member 231 to temporarily retain an edge of the ceiling sheet 204. The channel clamp 214 is used to secure the edge of the ceiling sheet 204 to the sheet retention member 230 by inserting the plurality of fasteners 216 through the channel clamp 214 and threading the plurality of fasteners 216 into the sheet retention member 231. The modified sheet clamp 226' is attached to the bottom support tube 302 with the plurality of fasteners 224. With reference to FIG. 26, the sheet clamp 226 is attached to the upright support tube 304 of a rafter 300 with the plurality of fasteners 224 and the ceiling sheet 204 is retained by the sheet clamp 226.

With reference to FIG. 27, a first ceiling sheet 204 is tacked to a bottom of the bottom support tube 302 with a first double sided tape portion 235, a second ceiling sheet 204 tacked to a bottom of the first ceiling sheet 204 with a second double sided tape portion 237 and a curved plate secured to the bottom support tube with the plurality of fasteners 224. With reference to FIG. 28, an insulation stick pin device 241 is inserted through the ceiling sheet 204 to retain a quantity of insulation. The insulation stick pin device 241 preferably includes a pin base 243, a stick pin 245 and an adhesive layer 247. The adhesive layer 247 is applied to a top of the pin base 243. The stick pin 245 extends upward from the pin base 243. The stick pin is inserted through the ceiling sheet 204 and the adhesive layer 247 sticks to a bottom of the ceiling sheet 204 to prevent insulation from sliding down a slope. With reference to FIG. 29, adhesive 249 in either liquid or tape form is applied to a top of the ceiling sheet 204 to prevent insulation from sliding down a slope.

Another structural option to prevent the insulation from sliding down the slope of the fabric ceiling would be to apply a liquid adhesive on the outer surface of the ceiling sheet for use with preformed batt insulation or applied within the insulation such as within various types of blow-in insulation, such as fiberglass, with has sufficient open time to allow the insulation to be placed on the fabric ceiling sheet where the adhesive then sets up to form one continuous layer adhered to the outward, exterior facing side of the flexible ceiling fabric material.

With reference to FIGS. 30-31, an insulation retention member 236 is placed over a top of the ceiling sheet 204 to prevent insulation 306 from sliding down the ceiling sheet 204. Two adjacent insulation retention members 236 may be secured to each other with at least one joining plate 238. A plurality of fasteners or rivets 240 are inserted through the joining plate 238 and the two adjacent insulation retention members 236. Each insulation retention member 236 preferably includes a bottom flange 242, an upright member 244 and a top flange 246. Preferably, the bottom flange 242 extends outward from a bottom of the upright member 244 in one direction and the top flange extends outward from a top of the upright member 244 in an opposite direction. With reference to FIG. 28, two adjacent insulation retention members 236 are secured around the upright support tube 304 of the rafter 300 with a pair of clamp halves 248. The pair of clamp halves 248 are secured to each other and the insulation retention members 236 with a plurality of fasteners or rivets 240.

While particular embodiments of the invention have been shown and described, it will be obvious to those skilled in the art that changes, modifications and the order of steps may be made without departing from the invention in its broader aspects, and therefore, the aim in the appended claims is to cover all such changes and modifications as fall within the true spirit and scope of the invention.

I claim:

1. An insulation system for portable buildings utilizing a plurality of rafters with a plurality of bottom support tubes and a plurality of upright tubes, comprising:
    a plurality of cross tube clamps each having a top plate and a bottom plate;
    a plurality of support struts being retained between two adjacent of the plurality of bottom support tubes with said plurality of cross tube clamps; and
    a ceiling sheet is retained on top of said plurality of support struts, wherein opposing edges of said ceiling sheet are secured to the bottom support tubes of two adjacent of the plurality of rafters.

2. The insulation system for portable buildings of claim 1 wherein:
    said bottom plate receives two adjacent of said plurality of support struts, said top plate receives one of the plurality of bottom support tubes.

3. The insulation system for portable buildings of claim 1 wherein:
    said two receiver plates receive one of the plurality of bottom support tubes and two adjacent of said plurality of support struts, wherein a lengthwise axis of said plurality of support struts are aligned with a lengthwise axis of the one of the plurality of bottom support tubes.

4. The insulation system for portable buildings of claim 1, further comprising:
    a sheet clamp includes a tube bracket, a channel clamp and a plurality of fasteners, wherein one end of said tube bracket is attached to one of the plurality of bottom support tubes, an opposing end of said tube bracket is attached to an edge of the ceiling sheet, wherein said channel clamp is secured to said opposing end of said tube bracket with said plurality of fasteners.

5. The insulation system for portable buildings of claim 1, further comprising:
    an insulation retention member having a bottom flange and an upright member extending upward from said bottom flange, wherein opposing ends of said insulation retention member are secured to two adjacent of said plurality of rafters such that said bottom flange is adjacent said ceiling sheet.

6. The insulation system for portable buildings of claim 5, further comprising:
    insulation is retained on said ceiling sheet, the insulation is prevented from sliding down said ceiling sheet with a plurality of said insulation retention members.

7. An insulation system for portable buildings utilizing a plurality of rafters with a plurality of bottom support tubes and a plurality of upright tubes, comprising:
    a plurality of cross tube clamps each having a top plate and a bottom plate;
    a plurality of support struts being retained between two adjacent of said plurality of upright tubes with said plurality of cross tube clamps; and
    a ceiling sheet is retained on top of said plurality of support struts, wherein opposing edges of said ceiling sheet are secured to the bottom support tubes of two adjacent of the plurality of rafters.

8. The insulation system for portable buildings of claim 7 wherein:
    said bottom plate receives two adjacent of said plurality of support struts, said top plate receives one of the plurality of bottom support tubes.

9. The insulation system for portable buildings of claim 7 wherein:
    said two receiver plates receive one of the plurality of bottom support tubes and two adjacent of said plurality of support struts, wherein a lengthwise axis of said plurality of support struts are aligned with a lengthwise axis of the one of the plurality of bottom support tubes.

10. The insulation system for portable buildings of claim 7, further comprising:
    a sheet clamp includes a tube bracket, a channel clamp and a plurality of fasteners, wherein one end of said tube bracket is attached to one of the plurality of bottom support tubes, an opposing end of said tube bracket is attached to an edge of the ceiling sheet, wherein said channel clamp is secured to said opposing end of said tube bracket with said plurality of fasteners.

11. The insulation system for portable buildings of claim 7, further comprising:
    an insulation retention member having a bottom flange and an upright member extending upward from said bottom flange, wherein opposing ends of said insulation retention member are secured to two adjacent of said plurality of rafters such that said bottom flange is adjacent said ceiling sheet.

12. The insulation system for portable buildings of claim 11, further comprising:
    insulation is retained on said ceiling sheet, the insulation is prevented from sliding down said ceiling sheet with a plurality of said insulation retention members.

13. An insulation system for portable buildings utilizing a plurality of rafters with a plurality of bottom support tubes and a plurality of upright tubes, comprising:
    a plurality of cross tube clamps each having a top plate and a bottom plate;
    a plurality of support struts being retained between two adjacent of the plurality of bottom support tubes with said plurality of said cross tube clamps;
    a ceiling sheet is retained on top of said plurality of support struts; and
    at least two sheet clamps each including a tube bracket, one end of said tube bracket is secured to one of the plurality bottom support tubes, an opposing portion of said tube bracket is secured to one edge of said ceiling sheet.

14. The insulation system for portable buildings of claim 13 wherein:

said bottom plate receives two adjacent of said plurality of support struts, said top plate receives one of the plurality of bottom support tubes.

15. The insulation system for portable buildings of claim 13 wherein:

said two receiver plates receive one of the plurality of bottom support tubes and two adjacent of said plurality of support struts, wherein a lengthwise axis of said plurality of support struts are aligned with a lengthwise axis of the one of the plurality of bottom support tubes.

16. The insulation system for portable buildings of claim 13, further comprising:

a channel clamp is secured to said opposing end of said tube bracket with at least one fastener.

17. The insulation system for portable buildings of claim 13, further comprising:

an insulation retention member having a bottom flange and an upright member extending upward from said bottom flange, wherein opposing ends of said insulation retention member are secured to two adjacent of said plurality of rafters such that said bottom flange is adjacent said ceiling sheet.

18. The insulation system for portable buildings of claim 17, further comprising:

insulation is retained on said ceiling sheet, the insulation is prevented from sliding down said ceiling sheet with a plurality of said insulation retention members.

* * * * *